United States Patent
McHenry et al.

(10) Patent No.: US 6,397,055 B1
(45) Date of Patent: May 28, 2002

(54) MOBILE TO MOBILE CALL DELIVERY FOR CALLING PARTY PAYS WIRELESS SERVICE

(75) Inventors: James McHenry, Point Pleasant, PA (US); John Nightingale, Jamesburg, NJ (US)

(73) Assignee: Bell Atlantic Mobile, Bedminster, NJ (US)

( * ) Notice: Subject to any disclaimer, the term of this patent is extended or adjusted under 35 U.S.C. 154(b) by 0 days.

(21) Appl. No.: 09/467,144

(22) Filed: Dec. 20, 1999

(51) Int. Cl.$^7$ .................. H04M 11/00; H04M 15/00; H04Q 7/20
(52) U.S. Cl. .................. 455/408; 455/406; 455/445; 379/114.05; 379/114.21; 379/114.28
(58) Field of Search .................. 455/406, 408, 455/445, 417, 560, 433, 461; 379/221.02, 114.26, 114.28, 115.01, 114.05, 127.01, 220.01, 114.21

(56) References Cited

U.S. PATENT DOCUMENTS

| | | |
|---|---|---|
| 5,353,331 A | 10/1994 | Emery et al. |
| 5,473,667 A | 12/1995 | Neustein |
| 5,557,664 A | 9/1996 | Burns et al. |
| 5,579,379 A | 11/1996 | D'Amico et al. |
| 5,666,405 A * | 9/1997 | Weber .................. 379/114.21 |
| 6,169,891 B1 * | 1/2001 | Gorham et al. .................. 455/408 |
| 6,263,056 B1 * | 7/2001 | Gruchala et al. .................. 379/114.26 |
| 6,311,053 B1 * | 10/2001 | Feit et al. .................. 455/406 |

* cited by examiner

*Primary Examiner*—Nay Maung
*Assistant Examiner*—Ray B. Persino
(74) *Attorney, Agent, or Firm*—McDermott, Will & Emery

(57) ABSTRACT

Landline facilities are linked to a wireless mobile network for calling party pays calls between wireless subscriber units. The wireless mobile network is provided with the ability to recognize that a called wireless station is a calling party pays subscriber. The wireless mobile network routes the call to a landline facility to undertake interactive communication with the calling station to determine whether the caller will agree to pay for both the called party's air-time charges and the calling party's air-time charges for the call. The landline facility can then access a database to determine if the carrier with which it is associated can provide billing functions with respect to the calling subscriber and, if so, activate such functions for a carrier entity so identified. If the carrier cannot handle billing for the call, the call may then be routed to a clearinghouse facility, which either can itself handle the billing functions, if such an arrangement with the calling party has been previously established, or communicate with the caller to authorize billing charges to a credit card. The clearinghouse facility or an alternative processor platform can rate the call charges that will be applied to the credit card bill. The call can then be completed to the called station through the wireless communication network while rating of air-time charges for both calling and called parties takes place. Calling party pays service is provided for a mobile call originating from a prepaid mobile user.

22 Claims, 6 Drawing Sheets

MOBILE TO MOBILE CALL DELIVERY FOR CALLING PARTY PAYS WIRELESS SERVICE

RELATED APPLICATION

This application contains subject matter that is related to subject matter disclosed in U.S. patent application Ser. No. 09/456,550, filed Dec. 8, 1999, assigned to the assignee of the present invention.

FIELD OF THE INVENTION

The present invention relates to an enhanced network architecture for providing Calling-Party-Pays billing services for customers of a wireless telephone network, such as cellular or personal communication service (PCS) customers. More particularly, enhancements are provided for calls originating from wireless phone units that are directed to Calling-Party-Pays customer wireless units.

BACKGROUND

Wireless telephone communication systems have evolved from the initially introduced Advanced Mobile Phone Service (AMPS) technology to more sophisticated digital-based air interface protocols. Digital access technologies have been developed based on Time Division Multiple Access (TDMA) or Code Division Multiple Access (CDMA) schemes. Although these digital access technologies have advantages with respect to analog-based systems, they have not yet been deployed in as many regions as AMPS-based systems. However, digital cellular subscribers in many areas presently are offered continuous coverage via dual-mode wireless telephones capable of switching between a digital mode (e.g., CDMA) and an analog mode (e.g., AMPS).

Ordinarily, charges for wireless services air-time charges are applied to the party subscribing to the wireless service. The wireless carrier bills, either directly or through the local exchange carrier, a monthly subscription fee plus per-minute fees for telephone communications over-the-air to and from each subscriber's telephone. A wireless subscriber is charged for the air-time, both on outgoing calls and on incoming calls directed to the subscriber's cellular or PCS telephone. In contrast, call charges for landline telephone service usually are billed to the subscriber associated with the calling station. Alternative landline billing arrangements are available for collect call billing or 800/888 type "toll-free" calling.

The costs for wireless air-time has tended to be high, compared to costs for traditional landline telephone services. In light of high costs and the fact that charges are incurred for air-time on incoming calls, many wireless subscribers have been reluctant to distribute widely their wireless telephone numbers. Such subscribers tend to utilize their wireless telephone for outgoing calls, as needed, but disclose their wireless telephone numbers to a limited number of friends or family from whom they are willing to pay to receive calls. Calls from relatively unknown parties, e.g. solicitors and nuisance sources, thereby are avoided.

To overcome these issues and to Encourage increased wireless usage, the wireless industry has developed a modified billing arrangement, commonly referred to as "Calling Party Pays." The intent of the service generally is to shift the air-time charges for calls to wireless telephones from the wireless subscribers to the callers. The calling party would pay for all network charges, in a manner more like that used in the normal landline service billing. A number of techniques have been developed for processing and billing call charges on a Calling Party Pays basis.

For example, U.S. Pat. No. 5,353,331 to Emery et al. discloses an intelligent network type integrated wireless and wireline system for processing calls to and from a Personal Communication Service (PCS) subscriber's wireless handset via a home base station or a public cellular network. The service logic in the integrated service control point (ISCP) facilitates a variety of service enhancements to the wireless PCS service. One of the disclosed service enhancements is calling party pays. When the intelligent network functionality detects a call to the PCS customer's number, the network accesses a call processing record for that customer. Based on that record, the network screens the call based on the caller's identity. If the caller is not a recognized party, the ISCP database causes the network to play an announcement asking the caller if he or she is willing to pay all charges for the call. If the PCS subscriber is currently registered via a public wireless network switching office, the announcement would ask if the caller is willing to pay for the air-time necessary to complete the call via a wireless link. If the caller accepts the charges, the ISCP provides messages to a landline switch and/or to a mobile switch to instruct them to complete the call and to add charges for the air-time to the calling party's telephone bill.

U.S. Pat. No. 5,579,379 to D'Amico et al. discloses an AIN-based PCS service similar to the Emery arrangement. D'Amico adds further details to the calling party pays operations of that network. When a call directed to a mobile subscriber is detected, the call processing is stopped to determine if the calling party pays feature is in operation. At the same time, the network collects data regarding the calling party for analysis. If the called subscriber is using the calling party pays feature, the ISCP analyzes the caller data to determine if the caller is on a list of those individuals not required by the particular mobile service subscriber to pay for cellular charges. If the calling party does not fall in this category, the network provides an announcement to the calling party, asking the calling party whether or not the calling party is willing to pay for air-time necessary to complete the call. If the caller indicates willingness to pay for the air-time, the AIN network functionality obtains correct billing information, and the network completes the call and computes the cellular charges.

In systems such as those of Emery et al. and D'Amico et al., a landline carrier typically operates the intelligent network and performs the routing services, for certain aspects of the follow-me functionality of the PCS service. The carrier operating that network also performs the billing services related to the Calling Party Pays feature. If the caller is a subscriber of the landline carrier, that carrier adds the air-time charges to the subscriber's normal telephone bill. The landline network carrier, rather than the cellular carrier, bears the responsibility of billing the calling party.

U.S. Pat. No. 5,557,664 to Burns et al. discloses use of a central database to determine whether to bill a calling party or a called party for charges for completion of a call to a mobile telephone. The illustrated system includes switches of a local exchange carrier network, switches of an interexchange carrier (IXC) network, one or more mobile switching centers and a service processor with announcement facilities, service logic and a database. If a calling station dials a telephone number of a party who subscribes to the calling party pays service, the local exchange switches extend the call to the originating IXC switch. The originating IXC switch provides a message, containing the dialed telephone number, to the service processor. The service processor retrieves a record corresponding to the dialed telephone number, and causes the announcement platform to provide an announcement regarding the pricing of the call through the network to the calling party. If the caller responds to the announcement by staying on the line to indicate acceptance of the charges, the service processor instructs the originating IXC switch to record billing information and notifies the billing system to charge the caller's account. The service processor also provides the mobile identification number (MIN) for completion of the call, to the originating IXC switch. The IXC network includes an indicator, preferably in the form of the dialed number, together with the MIN in the signaling to the mobile switching center, as an indication to inhibit normal billing for the call.

U.S. Pat. No. 5,473,667 to Neustein discloses a paging network. The system utilizes an automated attendant, which prompts a caller for desired information, to make a page. As part of the control of a paging operation, a central processor checks the profile of the paged party in the profile data base. The profile data enables the system to provide a number of enhanced services to paging service subscribers. In one of the enhanced services a paging party pays for the service on a per call basis. With the disclosed calling party pays type paging service, the caller calls the nearest central station and dials in the number of the pager he desires to page. The caller then enters his own billing number, for example his own telephone number or calling card number. If the billing number is valid, the system accepts an alphanumeric message or voice message from the caller and initiates paging of the called party's paging apparatus.

While all of the systems described above provide some level of effectiveness in billing for air-time to the calling party, each has certain practical limitations in actual use. When implemented in a real network, typically one carrier actually performs the calling party billing service for the wireless service provider. For example, using the Emery et al. type approach, a local exchange carrier might contract with a cellular carrier to perform the Calling Party Pays billing. In the Burns et al. system the IXC performs the billing. In the Neustein system, at least some billing is done through a separate credit card or calling card company. All of the prior art systems have been subject to some leakage, because invariably, the company processing the bills can not efficiently bill every type of caller.

As a practical matter, the carrier performing the bill processing function can pass the Calling Party Pays charges on only to those calling parties with whom that carrier has some type of existing billing arrangements. The local exchange carrier example actually provides the most effective solution, because on a very large percentage (typically 80–85%) of calls to the wireless telephone customers the callers are within the service area and are customers of the local exchange carrier. In such cases, the local exchange carrier can easily add the Calling Party Pays charges to the normal telephone bills for the callers. However, some calls will not originate from customers of the billing carrier. In the local carrier example, that carrier has no billing relationship with parties who make incoming calls through an interexchange carrier, parties calling from payphones, parties calling from a hotel or motel or hospital, parties served by a competing local exchange carrier, parties calling from other wireless networks, etc. Calls that the billing carrier can not process to bill the charges to the calling party are considered "leakage" with respect to the Calling Party Pays service.

The wireless carrier could elect not to complete calls that the billing carrier could not process for Calling Party Pays service (leakage), and the carriers would set the call processing logic accordingly. However, the types of incoming calls that the network completes are then limited. This blockage of certain calls affects the attractiveness of the Calling Party Pays service to wireless customers and sends a conflicting message to subscribers, particularly when the wireless carrier also is trying to encourage subscribers to widely distribute their wireless numbers to potential callers. To broaden usage in spite of leakage, some carriers have completed all incoming calls, and the wireless service carrier and/or the billing carrier has absorbed the leakage as a cost of doing business. The carrier(s) involved then must charge higher fees for the services or accept reduced profitability when compared to wireless services billed in the normal manner. Particularly from the point of view of the wireless carrier, who normally charges a per minute fee for all air-time, any completed but unbilled calling party pays calls essentially appear as lost revenues.

The other option for handling the problematic types of calls is to complete the calls to the subscriber but charge the air-time rates to the called subscriber. This approach is at odds with the purpose of the Calling Party Pays service. The subscriber would not know if an incoming call receives the Calling Party Pays treatment or accrues an air-time charge to the subscriber's own account. As a result, the wireless service subscribers would remain reluctant to distribute their wireless telephone numbers to large numbers of potential calling parties, who may call in such a manner as to still generate charges to the subscribers.

A need thus exists for systems and methodologies which enable one or more carriers to provide Calling Party Pays wireless services, with little or no leakage, i.e. no class of calls that the carriers cannot efficiently bill to the calling party. The above-identified copending application, Ser. No. 09/456,550, and incorporated herein by reference, addresses the above stated needs and overcomes the stated problems by providing a network architecture and call processing logic, which enable Calling Party Pays billing for calls to wireless subscribers including incoming calls that would otherwise leak through the billing operations of the principle carriers. A landline network routes incoming calls for a Calling Party Pays subscriber to the wireless carrier's network. The landline network recognizes each call that is subject to Calling Party Pays billing. If the carrier operating the landline network can bill a party associated with the calling station, that network routes the call to the mobile carrier's network and creates records for billing for the air-time. However, if the landline network cannot bill a particular calling party, the landline network hands the call off to another switch. This switch provides access to one or more alternate billing facilities. The alternate billing facilities preferably include a clearinghouse and a credit card billing system. A database indicates whether it is possible to bill for the air-time through the clearinghouse. If so, the switch completes the call to the mobile carrier's network and creates appropriate records to enable the clearinghouse to bill the air-time to the party associated with the calling station. If the caller is not billable through the clearinghouse, the switch extends the call to the automated credit card billing system. The credit card system makes all necessary records to bill the air-time charges for the call and bills the time against the caller's credit card account.

This arrangement as disclosed, however, would not provide the Calling Party Pays billing service in a call placed by a wireless station to another wireless station in the same system because no provision presently exists for passing such a wireless call to the landline local exchange carrier (LEC). Instead, routing and completion of the call would transpire within the mobile system, thus bypassing the landline Calling Party Pays system. While this system could be modified to send all mobile to mobile calls out to the LEC for screening, such a provision would create a great amount of wasted trunk traffic for calls directed to mobile destinations that do not subscribe to the Calling Party Pays service. A screening process in which the centralized database is accessed to lookup a nonexistent record frequently would occur and the processing time taken to route a call to a non Calling Party Pays subscriber would be unnecessarily lengthened.

Alternatively, provision of a Calling Party Pays screening capability in a redundant database within the mobile system itself would have attendant drawbacks. Such a provision would incur additional expense to duplicate elements that still would be necessary in the landline environment to handle calls that originate from units other than mobile system sets.

A further complication with either of these alternatives would arise in the handling of a call placed by a prepaid mobile caller to a mobile Call Party Pays subscriber set. Prepaid phone calling charge cards for pre-established amounts are commonly available for purchase at various retail vendors. A mobile phone subscriber can purchase a set amount of credit in advance of actual usage. The purchaser would then register with the system by calling in from the mobile phone to which the credit is to be applied. After successful registration, the system automatically applies calling charges for subsequent usage of the phone against the registered credit on a real time basis. As the balance decrements to established thresholds by real time call rating, announcements are transmitted informing the user that the credit limit is being approached. Any call still in progress when the total prepaid amount has been used is automatically terminated. The initiation of a prepaid mobile call to a Calling Party Pays mobile destination poses a challenge in tracking air-time charges in real time for both calling and called party usage, which often are determined at different rates, and appropriately allocating all charges to the calling party.

SUMMARY OF THE INVENTION

The present invention fulfills the aforementioned needs. An advantage of the present invention is that calling party pays (hereinafter CPP) billing treatment can be applied to a call from a wireless subscriber station to a wireless subscriber station, even if the calling station subscribes to a provider other than the provider of the called station.

A further advantage of the present invention is that various landline billing facilities are made available for calling party pays calls from mobile callers, while avoiding the need to access a land line database for non-calling party pays mobile calls. Such advantage can be achieved without providing a redundant database in the wireless telephone network.

Yet another advantage of the present invention is that calling party pays billing treatment can be applied to a call from a prepaid wireless subscriber station to a wireless subscriber station. The air-time charges for both the calling and called subscribers can be rated on a real time basis and charged against the prepaid credit of the calling party.

These and other advantages are satisfied, at least in part, by linking landline facilities to a wireless mobile network for calling party pays calls between wireless subscriber units. The wireless mobile network is provided with the ability to recognize that a called wireless station is a calling party pays subscriber. Upon such recognition at the outset of a call, the wireless mobile network will route the call to a landline facility to undertake interactive communication with the calling station to determine whether the caller will agree to pay for both the called party's air-time charges and the calling party's air-time charges for the call. Caller authorization may be obtained, for example, by voice communication or by DTMF entry. The landline facility can then access a database to determine if the carrier with which it is associated can provide billing functions with respect to the calling subscriber and, if so, activate such functions for a carrier entity so identified. If the carrier cannot handle billing for the call, the call may then be routed to a clearinghouse facility, which either can itself handle the billing functions, if such an arrangement with the calling party has been previously established, or communicate with the caller to authorize billing charges to a credit card. The clearinghouse facility or an alternative processor platform can rate the call charges that will be applied to the credit card bill. The call can then be completed to the called station through the wireless communication network while rating of air-time charges for both calling and called parties takes place.

In a preferred embodiment, initial recognition by the wireless network that a call is a calling party pays call is made at a mobile switching center. Future development of wireless networks may provide advantageous network element alternatives for this purpose. In one preferred embodiment, a range of telephone numbers is predesignated for assignment to calling party pays subscribers. The mobile switching center is set to identify a mobile originated call directed to one number of the predesignated range as a calling party pays call. In another preferred embodiment, telephone numbers assigned to calling party pays subscribers need not be allocated to a range predesignated therefor. In the latter arrangement, calling party pays subscriber numbers will be given an immediate call forwarding status in the mobile switching center. The forwarding number is associated with the landline facility that will communicate with the caller to obtain authorization to bill the caller for the called party air-time charges. In both embodiments, calls to parties that do not subscribe to calling party pays service will not be identified by the mobile switching center for routing to the landline, but will instead be handled in normal fashion.

The wireless telephone network preferably contains a processor platform node that provides real time rating for calls from pre-paid mobile callers registered in a database associated with the node. Included in the database is the subscriber's credit balance which cannot be exceeded by subsequent usage charges. A link to the node will be immediately established upon placement of a pre-paid mobile subscriber call, as the existing credit balance for phone usage must be correlated on a real time basis. The link will be maintained for calling party pays calls after the caller has indicated to the landline facility that billing for the called party air-time charges is accepted. The node will perform real time rating for both calling and called party charges and provide notification to the caller when the caller's credit has been decremented to a predetermined level. Usage will be terminated upon exhaustion of the credit balance.

Additional advantages of the. present invention will become readily apparent to those skilled in this art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The drawing figures depict the present invention by way of example, not by way of limitations. In the figures, like reference numerals refer to the same or similar elements.

DETAILED DESCRIPTION OF THE PREFERRED EMBODIMENTS

Figure 1:
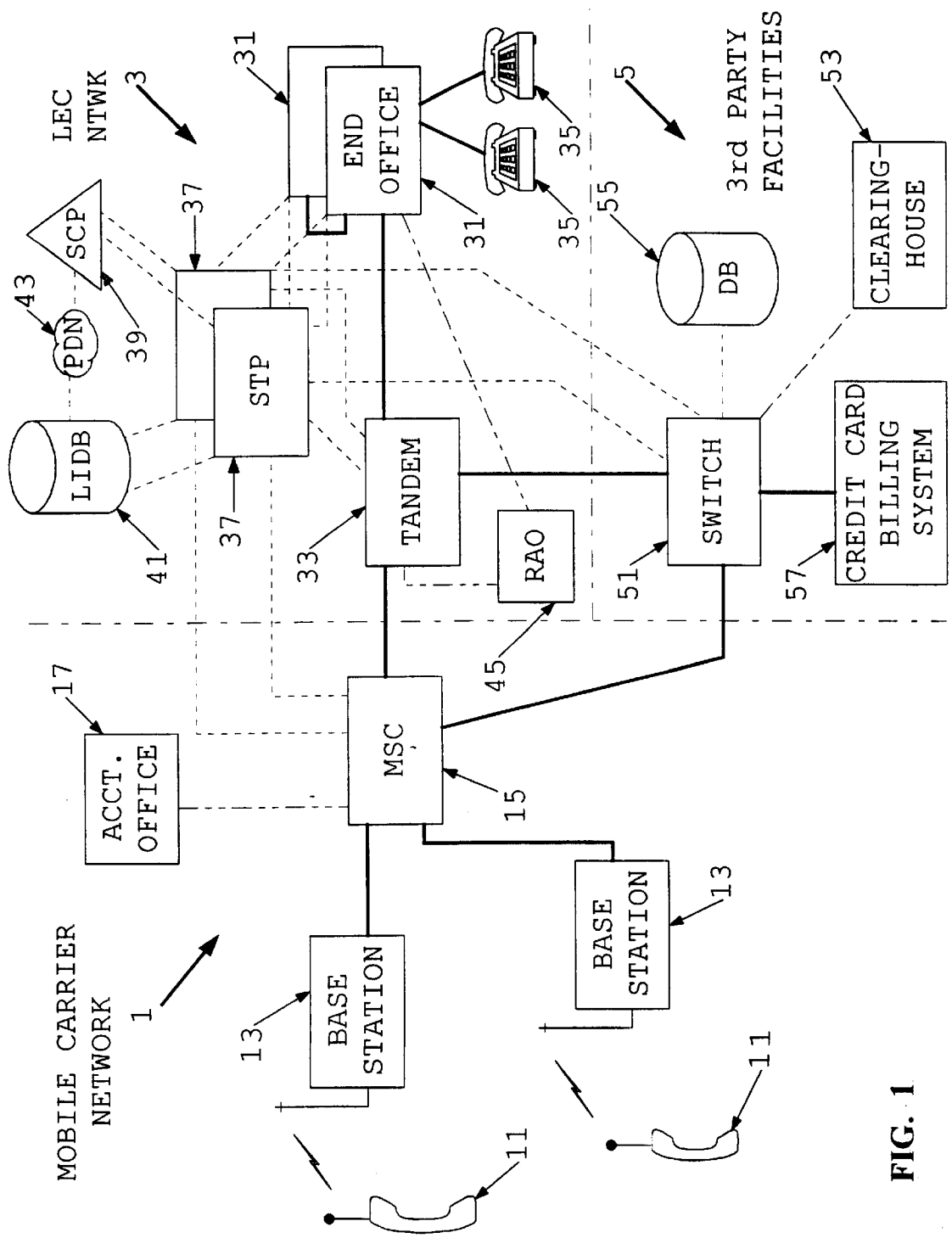
FIG. 1 is a simplified block diagram of a telecommunication system in accord with the invention for providing Calling Party Pays services.

The mobile-to-mobile CPP service capability of the present invention utilizes features and functionalities in a wireless telephone network in conjunction with, at least in part, system architecture and call processing logic described in the previously identified copending application Ser. No. 09/456,550, the disclosure of which has been entirely incorporated herein. FIG. 1 is a block diagram related to that system architecture and described below in relation to the present invention.

For simplicity of illustration, the wireless carrier network 1 is shown as comprising a pair of base stations 13, connected to a mobile switching center (MSC) 15 that is interfaced and interconnected with landline networks. The wireless telephone network 1 preferably has the capability of providing analog, digital, or dual-mode network services. Wireless base stations 13 typically provide cellular or PCS radio coverage over the geographic area serviced by the network 1. Communication between mobile subscriber terminals, or handsets, 11 at different base stations can be completed through the wireless network path between base stations and MSC 15. The base stations 13 send and receive radio signals communicated to and from the compatible mobile stations 11. The base stations 13 also communicate over trunk circuits to a mobile switching center (MSC) 15. The MSC 15 controls the operations of the network 1 and provides selective switched connections. The illustrative drawing is representative of a wireless communication system that can provide service to a great number of subscribers 11, through a plurality of bases stations 13 and MSCs 15.

As part of normal operations, MSC 15 accumulates detailed call processing data for calls is completed through the wireless network. The data for a completed call, for example, will include an identification of the mobile subscriber, the called and calling party telephone numbers, the time of the call and the duration of the call. MSC 15 supplies this data to accounting office 17, preferably through an appropriate data communication link. A billing computer operating in the accounting office 17 can process call records from various MSCs in the wireless network, to generate bills or invoices for delivery to the customers subscribing to the wireless carrier's services. The switched connections through the MSC 15 also provide selected call connections to the PSTN, for example to allow a user of mobile handset 11 to make a call to or receive a call from a landline telephone station.

Portions of a local exchange carrier network (LEC) 3 of the PSTN with which MSC closely interacts are represented in FIG. 1. The LEC telephone network includes a switched traffic network and a common channel signaling network that carries control signaling messages for the switched telephone traffic network. The telephone traffic network includes a number of end office type central office switching systems 31 and one or more tandem office type central office switching systems 33. Subscriber stations, depicted as telephones 35, are connected to the end office switches 31. Each end office type central office switch 31 provides switched telephone connections to and from local communication lines or other subscriber links coupled to end users stations or telephone sets 35. In the preferred implementation, the connections to the end offices 31 utilize telephone lines, and the switches 31, 33 are telephone type switches for providing landline communication. Of course, other communication links and other types of switches could be used, and the landline network 3 may be provisioned by a carrier other than the local exchange carrier.

Trunk circuits carry communication traffic between the end offices 31 and between the end offices 31 and the tandem switch 33. At least one tandem also provides trunk connections between the LEC network 3 and other carriers' networks. At least one trunk is linked between tandem 33 and MSC 15 of the mobile or wireless carrier's network 1. From the perspective of the network 3, all calls to or from the mobile stations go through tandem 33. Although not illustrated, tandem 33 may also provide connection to one or more interexchange carrier (IXC) networks.

The common channel interoffice signaling (CCIS) network portion of LEC 3 includes packet data links, illustrated as dotted lines, connected between appropriately equipped central office switching systems such as offices 31, 33 and a plurality of packet switches, termed Ad Signaling Transfer Points (STPs) 37. To provide redundancy and thus a high degree of reliability, the STPs 37 typically are implemented as mated pairs of STPs. The CCIS network of the telephone system operates under an accepted signaling protocol standard, preferably Signaling System 7 (SS7). Each central office 31 or 33 has at least minimal SS7 signaling capability, which is conventionally referred to as a signaling point (SP) in reference to the SS7 network. The offices can exchange messages relating to call set-up and tear-down, typically in the format defined by the ISDN User Part (ISDN-UP) of SS7. At least some, and preferably all, of the central office switches 11 are programmed to recognize identified events or points in call (PICs) as advanced intelligent network (AIN) type service triggers. In response to a PIC or trigger, a central office 31 or 33 initiates a query through the CCIS signaling network to a control node or a database system, for instructions or information relating to AIN type services. Central office switching systems having full AIN trigger and query capability are referred to as Service Switching Points (SSPs). For purposes of the CPP service, at least the tandem 33 has full SSP capability. MSC 15 of the wireless carrier network 1 has signaling capability and connects by SS7 signaling links to the STP pair 37 of the LEC network 3. Although not shown, the MSC 15 link can include an IXC STP path.

The databases or other control nodes of the AIN used in networks such as the LEC network 3 include a number of different types of systems facilitating an increasingly sophisticated range of new services. One example of a control node is the Service Control Point (SCP) 39. Another common example of such an AIN database system is a Line Identification Data Base (LIDB) 41. Reference is again made to the earlier identified copending application for a more detailed description of the SCP 39. SCP 39 and LIDB 41 may communicate with each other through private data network (PDN) 43. PDN 43 may be a packet switched data network, such as the TCP/IP network.

The LIDB database 41 is a general-purpose computer system having a signaling link interface or connection to a pair of STPs 37. The LIDB computer system runs a database program to maintain a database of information relating to customer accounts and identifications. For example, a subscriber's entry in the LIDB database might include the subscriber's telephone number, a personal identification number for credit card billing purposes, and the subscriber's name and address. The LEC LIDB 41 may contain one such record for each of the LEC subscribers with a defined service area. The LIDB 41 also contains a record for each wireless subscriber who subscribes to the CPP service. The record for each such wireless subscriber may be accessed by means of the wireless subscriber's mobile telephone number.

In a normal call in the LEC network 3, an end office type switch 31 will detect an off-hook condition on the line and provide dial tone. The switch 31 identifies the line by its office equipment (OE) number and retrieves profile information corresponding to the OE number and off-hook line. If needed, the profile identifies the currently assigned telephone number. The switch in the end office 31 receives dialed digits and routes the call. The switch may route the call to another line serviced by that switch, or the switch may route the call over trunks and possibly through one or more tandem offices 33 to an office 31 that serves the called party's station or line.

AIN call processing involves a query and response procedure between an SSP capable switching office and a control node or a database system, such as the SCP 39 or the LIDB 41. An SSP capable switching office will initiate AIN involvement upon recognizing a triggering event at a PIC during call processing. The triggering event effects a query to the appropriate node 39 or 41 to obtain a return instruction to the switching system for continuing call processing. A variety of types of triggers are available. The SCP 39 provides instructions relating to AIN type services. The LIDB 41 typically provides subscriber account related information, for calling card billing services or for subscriber name display purposes in an enhanced caller ID application.

In a call placed to a telephone number of a wireless or mobile station 11 from a landline terminal 35 of LEC network 1, the serving end office 31 recognizes the NPA-NXX digits in the dialed number as those of a carrier served through the tandem 33. The end office 31 responds by routing the call to the tandem 33. In normal call processing, the tandem would route the call to the MSC 15 for completion to the destination station 11 without intervention by AIN triggering. If the called party is a CPP subscriber, however, AIN call processing, preferably triggered in the tandem 33, is relied upon for processing the call. The presence of an account record for a subscriber of the mobile carrier in the LIDB 41 serves as an indication that a particular subscriber telephone number of the wireless carrier has an associated subscription to the CPP service. The AIN call processing logic within the SCP 39 then makes several determinations, which are used to decide how to proceed. For example, the SCP logic recognizes if the particular caller agrees to pay the charges and whether or not the LEC can bill the calling party. If appropriate, the SCP logic also may determine whether or not an exception applies to the CPP billing treatment for the specific call.

In normal operation, a switch examines a customer's service request, typically the destination telephone number and, based on customer profile or service information, determines if there is a need for AMA recording for the call, for example if the call is a long-distance call. If the call involves signaling communication with an SCP, an instruction from the SCP can override the normal decision process regarding AMA recording. For CPP calls, the SCP 39 can instruct the tandem switch 33 to make AMA records to enable billing calling LEC customers for air-time charges of the called party., AMA records are transported to a regional accounting office (RAO) 45. While such records may be stored on data tapes that are physically transported, switches preferably are provided with an appropriate data transfer link to allow electronic communication of the records to the RAO 45. The generation and accumulation of AMA record details and the various components of the RAO. are generally well known.

To provide for rating and billing of calls that would otherwise "leak" through the CPP operations of the networks 1 and 3, the system of FIG. 1 also utilizes certain additional facilities that may be provided by one or more third parties, collectively identified by the network portion 5. The third party billing entity network provides access to at least two billing alternatives for CPP calls that can not be billed by the LEC. In one alternative, billing functions are handled through a clearinghouse for non LEC subscriber callers who have pre-established relationships with the clearinghouse. The other alternative provides automated credit card processing, wherein interactive communication is conducted to obtain from the caller identity of a credit card account and authorization to bill thereto air-time charges for the called party. The functions of these alternatives and the elements of the third party billing network may be under complete or partial control of the clearinghouse.

Switch 51 of the third party network is generally similar in structure and operation to the switches of the LEC network 3. The switch 51 has normal telephone switching capabilities. The switch 51 may also have rating and data recording capabilities, which might be provided for example by AMA recording equipment in a telephone switching office. The switch 51 provides AMA records of certain CPP calls to a clearinghouse 53, for bill processing. Switch 51 connects through trunk circuits to both the LEC tandem 33 and the MSC 15. The switch 51 also communicates call set-up signaling with both the LEC tandem 33 and the MSC 15. The signaling may be in-band, but preferably uses SS7 communications, for example, through one or more STPs 37 of the LEC and/or another CCIS service provider (not shown).

The third party facilities 5 also include a database (DB) 55, which may be similar to the LIDB, but maintained by the third party. The database DB identifies all customers that the third party can bill through the clearinghouse 53. The switch 51 and database DB 55 may be implemented by a central office switching system and an intelligent network database system communicating via SS7, similar to the systems of the LEC, for example if the third party service provider is another carrier offering its own variety of telecommunication services. Alternatively, the third party may provide only the switch and database together with data communications to the clearinghouse. In such a case the third party may use other implementations of the switch 51 and database DB 55, such as an integrated unit with both telephone switching and database look-up capabilities.

In a CPP call, when the LEC tandem 33 routes the call to the switch 51, the systems of LEC network 3 already have determined that the calling party has agreed to pay the air-time charges but the LEC can not bill the particular subscriber associated with the calling station. The switch 51 executes a routine to access the database 55 to determine if the third party can bill the calling station subscriber via the clearinghouse. If so, the switch 51 completes the call through the MSC. At this time, the switch makes the AMA records for later delivery to the clearinghouse system 53 and provides the signaling to the MSC 15 to suppress its normal data reporting regarding billing.

If the call can not be billed through the clearinghouse, automated credit card billing system 57 is invoked. The switch 51 provides selective call connections, for voice grade communications with callers, to the credit card billing system 57. The system 57 is a standard system for providing voice prompts, to callers and collecting dialed digit or spoken information, for example, to obtain a credit card number from a caller. The system may also obtain expiration date and a PIN relating to the caller's credit card account. The system 57 communicates with existing credit card company equipment to verify account status and apply accrued charges to identified credit card accounts. The system 57 also includes telephone call rating equipment, to time telephone calls processed through the system 57 and calculate costs for such calls, including the billable air-time charges. The system 57 remains in the call connection in order to time rate the call. The switch 51 does not make AMA records, but signals the MSC 15 to suppress its normal data reporting regarding billing. The billing system 57 accumulates the necessary records regarding the call and charges appropriate fees to the caller's credit card account.

Calls placed to a telephone number of a wireless or mobile station from a calling wireless station in a mobile system conventionally are handled internally. That is, call routing remains within the system, apart from the LEC PSTN. This conventional routing process, as previously discussed, does not satisfactorily provide for a CPP call from a mobile caller to a mobile called party. In accordance with the present invention, the architecture of FIG. 1 is utilized to overcome this deficiency. The wireless network does not require redundant duplication of landline facilities. Instead, the landline network, illustrated in FIG. 1, is accessed through recognition in the wireless network that a mobile call is being placed to a CPP mobile subscriber.

Figure 2A:
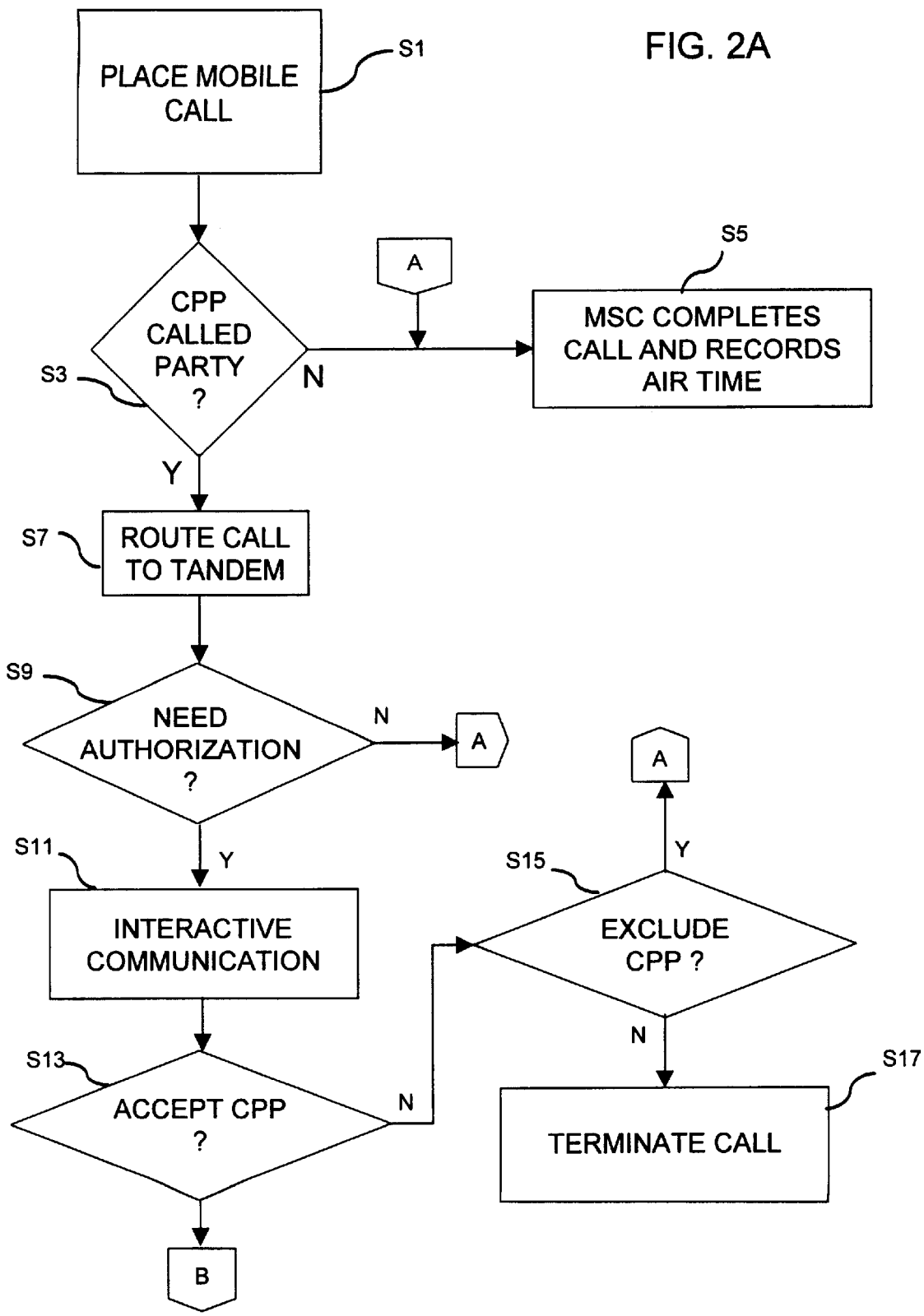
FIGS. 2A and 2B are portions of a flow chart of the call processing of a mobile-to-mobile CPP call in accordance with the present invention.
Figure 2B:
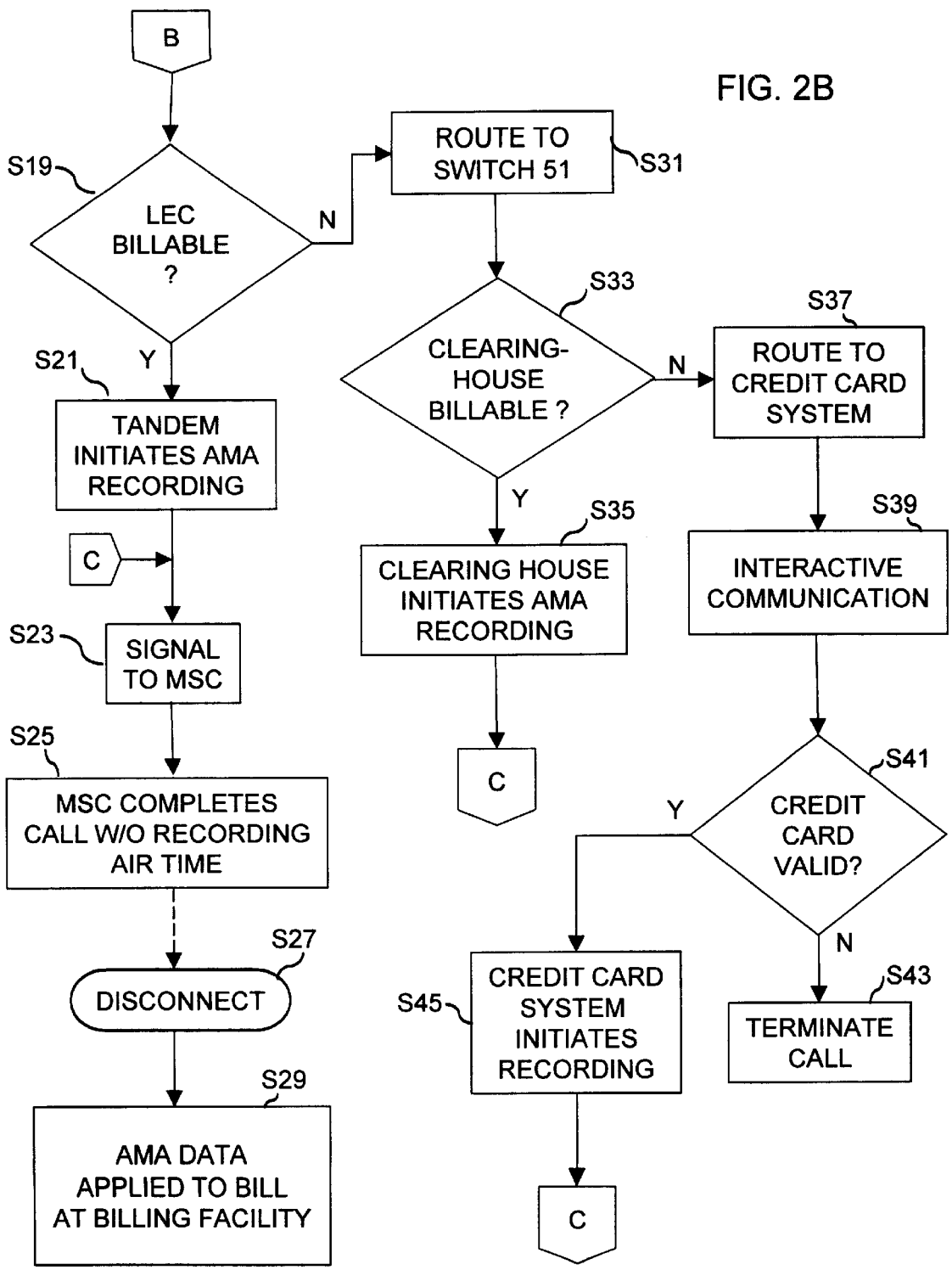

FIGS. 2A and 2B are portions of a flow chart summarizing call processing of a CPP call originating at a mobile call unit. At step S1, a call is placed at a mobile handset to a mobile telephone number. A determination is made (step S3), preferably at the mobile switching center, of whether the called party is a CPP subscriber. The manner in which CPP status of the call can be recognized is described below. If the call is determined to be directed to a mobile station that does not subscribe to CPP service, the call remains in the wireless network system to be processed in conventional fashion (step S5). When the call is answered, the MSC creates the data records necessary to bill the called party air-time charges for the call to the called subscriber. The MSC will complete the call and record the caller's air-time to be billed to the caller. The charge data for both parties are forwarded to the accounting office 17, for bill processing.

If it is determined at step S3 that the call is a CPP call, the call is routed through the MSC 15 to tandem 33 at step S7. At step S9, the tandem 33, through interaction with appropriate landline network resources, determines whether authorization must be sought from the caller to be billed for the air-time charges for the called party. For example, by virtue of identifying the trunk from which the call has been routed as an MSC link, the tandem is alerted that additional treatment by the tandem is required. The tandem, through the AIN network, can then access SCP 39 and LIDB 41 to establish that the call is a CPP call. Wireless CPP service subscribers have associated records in the LIDB database. A record may include a VIP list that indicates that the calling party is to be unconditionally excluded from CPP charges or that exclusion is predicated upon any of a number of conditions. For example, exclusion may require obtaining a PIN or other identifying information from the calling party. Exclusion may also be linked to geographical considerations. The record for the called party is checked for calling party number CPP exclusion information. If the call is excluded CPP status without requiring input from the caller, the negative outcome of decision step S9 directs the flow chart branch back to step S5 to complete the call processing without further treatment in the land line network.

If caller authorization is required, an interactive session is undertaken at step S11 between the tandem 33 and the caller. A recorded announcement can be transmitted that informs the caller of the CPP status of the call and requests the caller to accept billing for the calling party's air charges or to respond with information that would exclude the caller from such billing, such as PIN identification, for comparison with information in the SCP or LIDB databases. This step can be implemented by connecting the call from switch 33 either to an internal announcement platform (not separately shown) or an external platform, such as an intelligent peripheral, to provide the announcement. The caller's response may be input by DTMF keying or by voice, as the tandem has capability for voice recognition as well as DTMF signal recognition. At step S13, the tandem determines whether the caller has accepted responsibility for payment of the called party's air charges for the call. A negative outcome in that step may result from either a refusal to pay for such charges or a response by the caller that qualifies as an exclusion from CPP status, such as. valid PIN number, as illustrated by the decision block step S15. If the caller is excluded from CPP status, the flow chart reverts to step S5 for call completion as previously described. The caller may indicate refusal to pay for the called party charges either by verbal or DTMF response or simply by hanging up. If step S15 determines that the call maintains its CPP status but that the caller has not agreed to pay for the called party's charges, the call is terminated at step S17.

If step S13 indicates that the caller will accept billing for the called party's billing charges, the process branches to step S19 (FIG. 2B), wherein the LEC SCP is accessed to determine whether the LEC can bill the calling party. Mobile users generally subscribe to wireless carriers that do not populate records in the LEC database. However, in some instances cooperative arrangements between the carriers for such purposes may exist, possibly to a greater extent in the future as closer relationships among these entities develop. The SCP may make this determination of billing capability from LEC data records stored in the SCP 39, or the SCP may communicate with the LIDB 41 through the private data network 43, essentially to reference the calling party billing record within the LIDB.

If the LEC can bill the caller, the SCP 39 returns an instruction to the LEC tandem 33, which causes several actions by the LEC tandem to act as the billing facility. The tandem 33 initiates AMA recording for the call within the tandem at step S21. The tandem will record all necessary information to enable billing for the call to the LEC's calling subscriber. For example, at this point, the tandem 33 makes an initial AMA journal entry recording the calling and called party numbers. The tandem 33 also provides special signaling to the MSC 15 at step S23 to complete the call to the called party. As the LEC will supervise the billing to be allocated to the calling party, LEC tandem 33 is provided with rate information for both the calling and called parties. As there is thus no need for the MSC to record air-time, signaling step S23 indicates, for example by setting a flag in the signaling message, to the MSC not to record air-time. It is preferable, from the perspective of billing efficiency, that the tandem handle air-time charges for both parties. However, other conditions may dictate desirability for maintaining the recording function for the caller's air-time with the MSC. For example, the LEC may not have access to both the calling and called parties' air-time rates. Thus signaling step S23 may indicate some apportionment of billing responsibilities to the MSC.

At step S25, the MSC 15 completes the call without recording air-time in the illustrated embodiment. When the called station answers, the billing facility makes an answer entry on its AMA journal entry, to register the time of initial connection. At a later time, one or the other of the parties to the completed call ends the connection, typically by hanging-up (step S27). The various offices of the networks 1, 3 take-down the link between the stations. At this time, the billing facility makes a terminating entry on its AMA journal, to register the time of disconnect. At step S29, the billing facility uploads all entries from its AMA journal relating to CPP calls to an appropriate regional accounting office. A common identifier in each entry for a particular call serves to link the entries relating to the call, to distinguish them from those of other calls. The RAO executes a series of processing steps (not shown) to assemble the messages regarding a call into a set and from the message set compile a billing record for inclusion on the calling subscriber next monthly invoice.

If it is determined at step S19 that the LEC can not bill this caller, the flow chart branches to step S31, wherein the call is routed further from tandem 33 to switch 51 via a trunk group connected therebetween. The SCP 39 transmits a response message back to tandem 33 that indicates inability of the LEC to assume billing functions. The tandem 33 provides all of the necessary information regarding the call to switch 51, via standard interoffice signaling, preferably using ISDN-UP messages over SS7 links. At step S33, switch 51, having received the call from tandem 33, queries database 55 maintained by the third party network. This database identifies all customers that the third party can bill through the clearinghouse. The flow chart will branch will branch from step S33 on the basis on whether or not the call is billable to the caller through the clearinghouse 53.

If the third party can bill the caller through the clearinghouse, database 55 returns a message informing the switch 51 of the billable status. At step S35, switch 51 initiates AMA recording for the call. The remainder of the call processing essentially reverts to steps S23–S29, wherein switch 51 routes the call to the MSC 15 over an appropriate trunk with signaling instruction for MSC 15 not to record call data for billing the air-time to the called party. The MSC 15 will complete the call to the called station 11 without recording billing information. Upon disconnection, the clearinghouse billing facility assembles billing information for the call for invoice processing by the appropriate accounting office. With respect to billing and invoice functions, the clearinghouse may operate in similar fashion to the LEC tandem and accounting offices.

If the clearinghouse database 55 does not contain an appropriate record for the calling party, step S33 will indicate that the clearinghouse cannot bill the caller for air-time charges. The call then will be routed by switch 51 to credit card billing system 57 at step S37. At step S39, the credit card billing system 57 interacts with the caller to obtain a credit card number and any other information necessary to enable billing for the costs against the caller's credit card. This interaction may involve announcements providing instructions to the caller and receipt of dialed digits or spoken answers as inputs from the caller. The system 57 may communicate with existing credit card company equipment to verify account status. If the caller hangs-up or cannot provide appropriate credit card information, as determined at step S41, the call is terminated at step S43.

If a credit card transaction has been successfully undertaken as indicated by a "Y" branch in step S41, the system 57 initiates call-rating at step S41 and provides an instruction to the switch 51. Thereafter, processing continues in similar manner to the above-describes steps S23–S29. The MSC 15 completes the call to the called station but, in accordance with signaling received via switch 51, the MSC does not record information about the call for billing purposes. Because the credit card billing system 57 remains connected to the call, the system 57 will recognize when the caller answers. At that time, the credit card billing system initiates the timing for its call rating function, as represented by step S45. Upon disconnect, the link between the calling and called stations is taken down and the billing system 57 ends its timing of the call. The call rating equipment in the system 57 calculates the costs the completed call, including the billable air-time charges for both parties and prepares a credit card bill. The system 57 may communicate the costs to existing credit card company equipment, to apply accrued charges to the caller's identified credit card account.

In accordance with the present invention, the mobile switching center preferably may determine whether a dialed call is a CPP call, at step S3, in at least two alternative approaches. In order to distinguish a CPP from a non-CPP call in one preferred mode, CPP subscribers are assigned telephone numbers from an allocated range of numbers that are predesignated for this purpose. The mobile switching center will identify the number range in its stored database. Any call having a destination number that matches the number range is directed to the tandem trunk. As the predesignated number range should be large enough to accommodate the number of CPP subscribers, expansion of the allocated range may require consideration as the number of subscribers of the service increases. A second alternative does not limit the amount of telephone numbers that can be allocated to CPP subscribers. With the latter embodiment, each CPP subscriber number is set in the mobile switching center with an immediate call forwarding status that causes an incoming call to that number to be forwarded by the MSC to the tandem trunk. The tandem, in both of these arrangements, may originate its call processing functions in response to recognition that the trunk from which the call has been received is a dedicated CPP trunk. In lieu of a dedicated trunk, appropriate signaling can be included with the routed call to initiate the appropriate tandem call processing functions.

Immediate call forwarding status can be set at the mobile switching center, for example, by insertion of an additional digit in the subscriber profile stored at the switch. The MSC thus can recognize an incoming call having the extra digit as a CPP call and forward the call to the LEC tandem destination, with the extra digit stripped from the called number signaling information transferred to the tandem. When the call ultimately is to be connected to the called party, after CPP and billing authorization has been established, appropriate signaling can be provided to suspend the call forwarding status for the call at the MSC so that the call will be completed to the called party. Alternatively, identification of the return trunk can be used to suspend the call forwarding status when the MSC completes the voice path to the called party.

Figure 3:
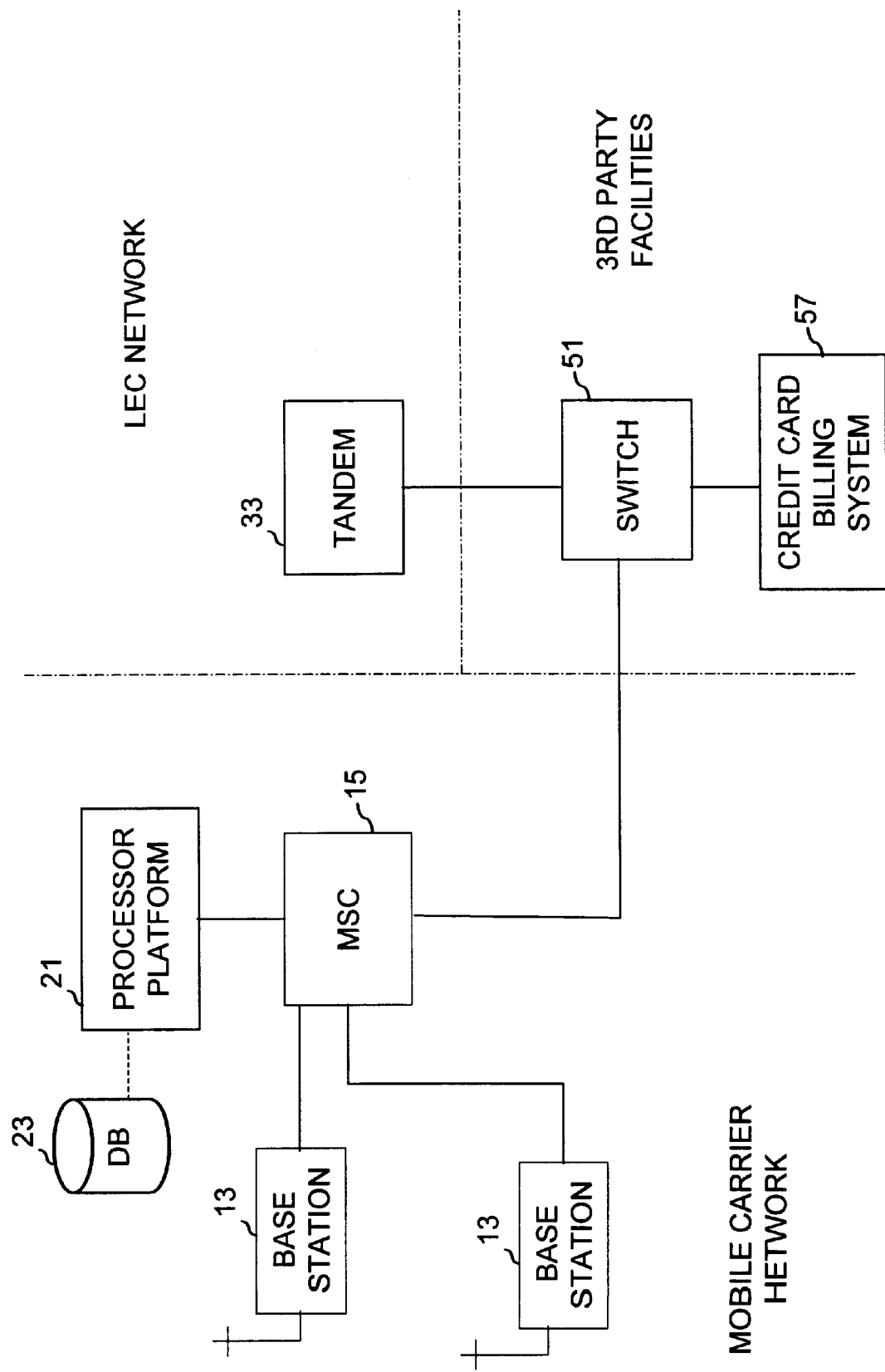
FIG. 3 is a block diagram of network architecture portions that are implemented in accordance with the present invention for processing prepaid mobile-to-mobile CPP calls.

An additional aspect of the present invention is the implementation of CPP treatment to mobile calls originating from a prepaid mobile user. Mobile users may individually purchase, from various retailers, a selected credit value against which future charges for air time usage will be applied. Prepaid usage has become increasingly popular. To ensure that usage does not exceed the purchased amount, and to keep the user informed of the remaining usage time available, the mobile switching system includes a dedicated processing platform. FIG. 3 is a partial block diagram illustrative of the prepaid architecture in the context of the present invention. Processor platform (node) 21 is connected by a trunk group to mobile switching unit 15. Database 23, which serves node 21, is connected thereto by a data communication path. Database 23 contains records for all registered prepaid customers. The records store credit available and air-time rates. After purchase of prepaid usage, the customer will call the system to register and establish a record in the node database. This call is routed to the processor platform, which will identify the customer's telephone unit and purchase amount to be stored in a new customer record in the database. The customer's telephone number or equivalent will be set in the mobile switching center so that future calls from the customer unit will be recognized as originating from a registered prepaid account user. The processor platform will be linked with calls originating from the prepaid customer unit to perform a real time rating of air usage in accordance with the appropriate rate. In conjunction with the database 23, the processing platform obtains the rate information and credit balance at the beginning of the call and updates the database upon call completion. The platform retains voice communication capability with the caller throughout the call to announce the remaining call minutes available.

Figure 4:
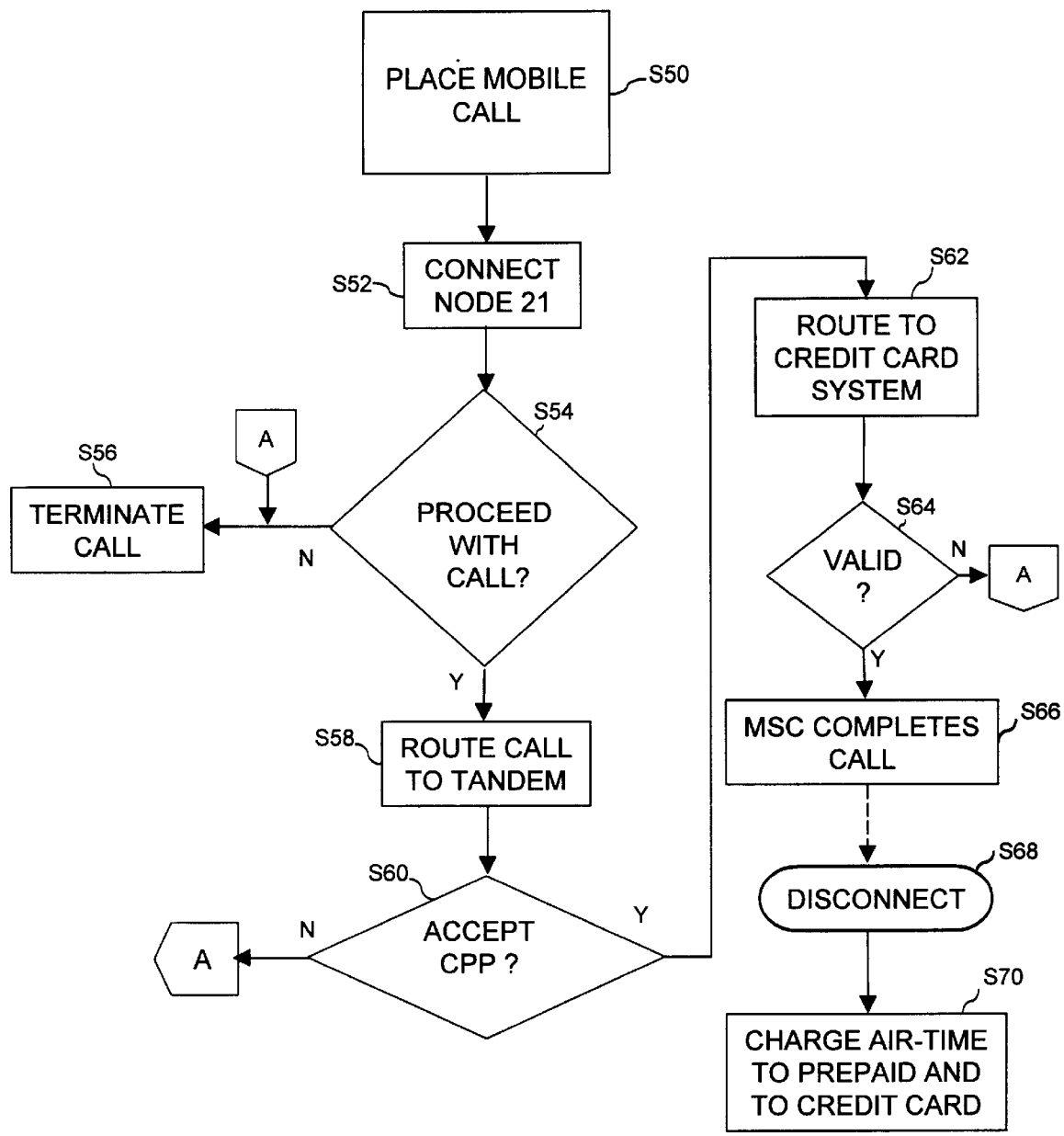
FIG. 4 is a flow chart of call processing of prepaid mobile-to-mobile CPP calls according to the present invention.

Billing for calls from prepaid mobile users to CPP mobile destinations imposes additional complexities. FIG. 4 is a flow chart illustrative of one method for processing such calls in accordance with the present invention. At step S50 a prepaid user places a call to a CPP destination. MSC 15 recognizes the call as originating from a registered prepaid user and connects the call to node 21 at step S52. The processing platform accesses the associated database to retrieve credit and rate information for the calling party and interacts through the voice communication link with the caller. The credit balance and remaining minutes available are related to the caller and a decision is made as to whether the call is to proceed. These functions are represented by step S54. If the credit balance is insufficient for the caller's intended use, the call is terminated at step S56. If the call is to be processed the MSC then identifies the call as a CPP call in a manner described above. At step S58, the call is then routed to tandem 33, which engages voice communication with the caller to announce that the called party is a CPP customer and to obtain the caller's acceptance of the CPP arrangement. If decision step S60 indicates refusal of the caller to accept the CPP arrangement, the call is terminated. In response to a positive outcome in step S60, the call is routed from the tandem 33 to the credit card billing system 57 through switch 51 at step S62. Interaction between this system and the caller proceeds as previously described to determine at step S64 whether a valid credit card is authorized for application of charges for the called party's air time charges. If validation fails, the call will be terminated. If the credit card charge is authorized, signaling is undertaken with the MSC to complete the call at step S66. The call is routed to the called party. During the course of the call until disconnection at step S68, the node 21 processor rates the air-time charges for the calling party on a real time basis, applying the charges against the caller's prepaid credit balance. The called party's air-time charges are tracked by the credit card system to be applied to the caller's credit card bill. These rating and billing functions are represented by step S70.

In this method, the prepaid processing node tracks the caller's air usage in real time without regard to the charges accumulated by the called party air-time usage. Advantages to separately billing the latter charges to the caller's credit card account are that the prepaid credit balance can be conserved and that the processing node 21 need not be involved in the rating process and billing records for the called party usage. As an alternative method of the present invention, processing node 21 handles the real-time rating of both calling and called party air-time usage, applying the charges dynamically against the caller's prepaid credit balance. This alternative provides advantages for use with relatively large credit balances. Application of two rates for the call is well within the capability of the processing platform; the use of trunk communication and the delay of signaling to third party facilities are obviated.

Figure 5:
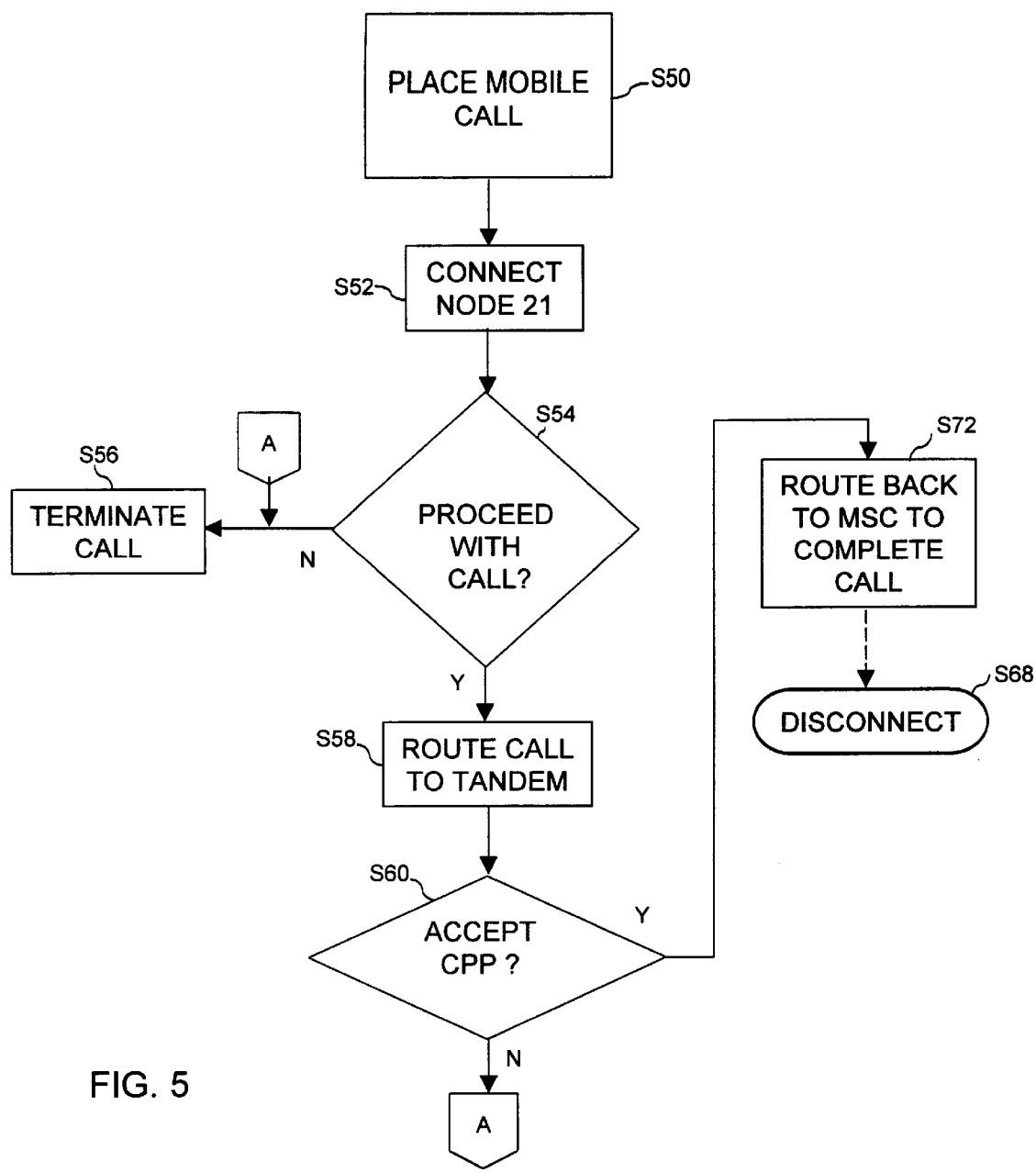
FIG. 5 is a flow chart of call processing of pre-paid mobile-to-mobile CPP calls according to an alternative method of the present invention.

FIG. 5 is a block diagram of this alternative embodiment. Elements that perform as described above with respect to FIG. 4 bear the same reference numerals and need no further detailed discussion. As in the operation illustrated in FIG. 4, upon placement of a mobile call, the processing node is linked by the MSC for rating the prepaid call. Upon acceptance of the CPP arrangement by the caller, as determined by the tandem 33 at steps S58 and S60, the call is routed back to the MSC to complete the routing to the called party at step S72. Communication between the MSC, which has recognized that the CCP status has been accepted, and the processing platform 21 alerts the latter to commence real-time rating of the air charges for both calling and called parties. Both charges are dynamically applied against the caller's credit balance throughout the call until disconnection. The node communicates with the caller as the credit balance decrements to predesignated threshold levels, as done with ordinary prepaid calls.

Those skilled in the art will recognize that the present invention admits of a number of modifications, within the spirit and scope of the inventive concepts. In the above discussed examples, the various switches recorded call related data using AMA recording equipment and procedures. Those skilled in the art will recognize that other techniques may be used to accumulate the data regarding the time, duration and called/calling party numbers for billing by the carrier and/or for billing through. the clearinghouse. For example, in a prepaid mobile caller CPP call, the system can be arranged to provide rating of the called party's air-time charges by either the processing node 21 or a credit card system depending upon factors such as remaining prepaid credit balance or charge rates. As a further modification, the clearing house could be used in lieu of, or in combination with, the credit card system to rate and bill the caller for the called party's charges.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. For a wireless telephone network including a mobile switching center for interfacing a wireless base station with a landline network, a method for processing a telephone call placed from a wireless telephone calling station to a wireless telephone called station comprising the steps of:

in response to initiation of said telephone call by said calling station, a first determining step of determining in said wireless telephone network whether said called station subscribes to calling party pays billing service;

in response to an indication in said first determining step that said called station subscribes to calling party pays billing service, routing the call from the calling station to a predetermined switching office of the landline network;

a second determining step of determining at said predetermined switching office whether authorization to bill the calling station is required;

communicating between said predetermined switching office and said calling station to decide whether authorization is given by said calling station to bill said calling station for charges for the call;

in response to receipt of said authorization in said communicating step, establishing a billing facility for applying charges for the call and issuing a bill in accordance therewith; and completing the call to the called station through the wireless communication network.

2. A method as recited in claim 1, wherein said first determining step is performed at the mobile switching center.

3. A method as recited in claim 2, wherein said calling station is a pre-paid subscriber and said billing facility comprises a processing platform, having a database associated therewith, connected to said mobile switching center, and wherein said step of establishing comprises accessing the database associated with said processing platform.

4. A method as recited in claim 1, wherein, in response to an indication in said first determining step that said called station does not subscribe to calling party pays billing service, routing the call from the calling station to the called station through the wireless telephone system.

5. A method as recited in claim 1, wherein calling party pays billing service subscriber stations are allocated telephone numbers within a predetermined number range and said first determining step comprises recognizing that the called number is within said predetermined range.

6. A method as recited in claim 1, wherein calling party pays billing service subscriber stations are assigned telephone numbers having a call forwarding status, and said first determining step comprises recognizing said call forwarding status.

7. A method as recited in claim 6, wherein said call forwarding status identifies said predetermined switching office as a routing destination and said recognizing step is performed at the mobile switching center.

8. A method as recited in claim 1, wherein step of communicating comprises sending a message from said predetermined switching office to said calling station and receiving a response at said predetermined switching office from said calling station.

9. A method as recited in claim 8, wherein said response comprises a voice transmission.

10. A method as recited in claim 8, wherein said response comprises a DTMF signal transmission.

11. A method as recited in claim 1, wherein said billing facility resides in a local exchange carrier network.

12. A method as recited in claim 1, wherein said billing facility comprises a clearinghouse system.

13. A method as recited claim 1, wherein said billing facility comprises a credit card system.

14. A method as recited claim 1, wherein said step of establishing comprises:

accessing a database in a local exchange carrier network (LEC) to seek a determination that the LEC can bill charges to a party associated with the calling station;

in response to said determination in said accessing step, applying a LEC billing facility to supervise rating charges for the call;

in the absence of said determination in said accessing step, routing the call to a clearinghouse facility; and accessing a database associated with said clearinghouse facility to seek an alternate billing entity.

15. A method as recited claim 14, wherein the clearinghouse facility database contains entries of telephone subscribers with which the clearinghouse billing arrangements, and further comprising the steps of in response to a determination that the clearinghouse facility database does not identify the calling station as an alternate billing entity, commencing an interactive voice link between said clearinghouse facility and said calling station; and obtaining authorization from the calling station through said interactive voice link to apply charges for the call to a valid credit card.

16. A method of providing a calling party pays billing treatment on a call placed by a calling wireless telephone station to a called wireless telephone station comprising the steps of:

determining in a wireless telephone network that the called station is a calling party pays subscriber station;

routing the call from the wireless telephone network to a landline facility of a public switched telephone network;

obtaining at said landline facility authorization from the calling station to charge the calling station for the call;

establishing a billing facility. for supervising billing functions for the call; and completing the call to the called station.

17. A method as recited in claim 16, wherein said determining step comprises recognizing at a mobile switching center of said wireless telephone network that the telephone number of the called station is among a range of telephone numbers predesignated for calling party pays subscribers.

18. A method as recited in claim 16, wherein said determining step comprises associating at a mobile switching center of said wireless telephone network that the called telephone number is associated with an immediate call forwarding feature and said routing step is performed in response to activation by the mobile switching center of the immediate call forwarding feature.

19. A method as recited in claim 16, wherein said billing facility is operated by a landline local exchange carrier.

20. A method as recited in claim 16, wherein said billing facility is operated by a clearinghouse system.

21. A method as recited in claim 16, wherein said calling station is a prepaid subscriber and said billing facility comprises a processing platform having a database associated therewith containing records of prepaid subscribers and their respective credit balances, and further comprising the steps of maintaining a link between said processing platform and a mobile switching center for said call;

rating in real time at said processing platform both caller and calling charges; and notifying said calling station during progress of said call when the remaining prepaid credit for said calling station has decremented to a predetermined threshold.

22. A method as recited in claim 21, wherein said processing platform is in the wireless telephone network and connected to said mobile switching center.

* * * * *